UNITED STATES PATENT OFFICE.

STEPHEN F. AMBLER, OF BROOKLYN, NEW YORK.

IMPROVEMENT IN THE MANUFACTURE OF AERATED BREAD.

Specification forming part of Letters Patent No. 36,134, dated August 12, 1862.

*To all whom it may concern:*

Be it known that I, STEPHEN F. AMBLER, of Brooklyn, Kings county, State of New York, have invented, made, and applied to use certain new and useful Improvements in the Manufacture of Unfermented Bread; and I do declare the following to be a full, clear, and correct description of the same.

The nature of my invention consists in the use or employment in the manufacture of unfermented bread of carbonic-acid gas made by fermentation from saccharine or farinaceous matter, as hereinafter fully described, by the use of which the bread is rendered cheaper, lighter, and whiter, and its cost of manufacture is considerably reduced.

To enable those skilled in the arts to make and use my invention, I will proceed to speak of the same.

Prior to my invention the carbonic-acid gas used in the manufacture of unfermented bread was made from sulphuric acid and the carbonate of lime or carbonate of soda. The objection to the use of carbonic-acid gas thus made is its high cost and the fact that in its manufacture other injurious gases are frequently formed.

My process may be thus described: I place any desired quantity of farinaceous or saccharine matter in a vessel, and in the case of the farinaceous matter treat it as follows: Corn-meal used is first heated to 180° Fahrenheit, and cooled by stirring to 160° Fahrenheit, when rye-meal and malt are added; then cooled to 65° to 70° Fahrenheit, and the yeast is added; then placed in a tight vessel, in which vessel is inserted a pipe conducting the gas as formed to a gasometer or gas-holder. In case saccharine matter be used, the molasses is diluted by adding a quantity of water, is cooled to from 65° to 70° Fahrenheit, when the yeast is added, and the process first described is repeated. The gas thus formed is passed from the gasometer or gas-holder to the necessary vessels.

By making carbonic-acid gas as described not only the quality of the gas formed is improved, but the alcohol remaining in the farinaceous or saccharine matter pays the cost of the farinaceous matter or saccharine matter used.

While my improvement is particularly applicable to unfermented bread, it will be found equally useful in the manufacture of soda-water, to which I have applied it.

Having thus described my invention, what I claim therein as new, and desire to secure by Letters Patent, is—

In the manufacture of unfermented bread, the use or employment of the carbonic-acid gas made as herein fully described, for the purposes specified.

STEPHEN F. AMBLER.

In presence of—
   A. TURNER,
   A. SIDNEY DOANE.